Jan. 29, 1952 J. F. WEBSTER 2,583,911
FLOATING BIRDBATH
Filed Oct. 20, 1950
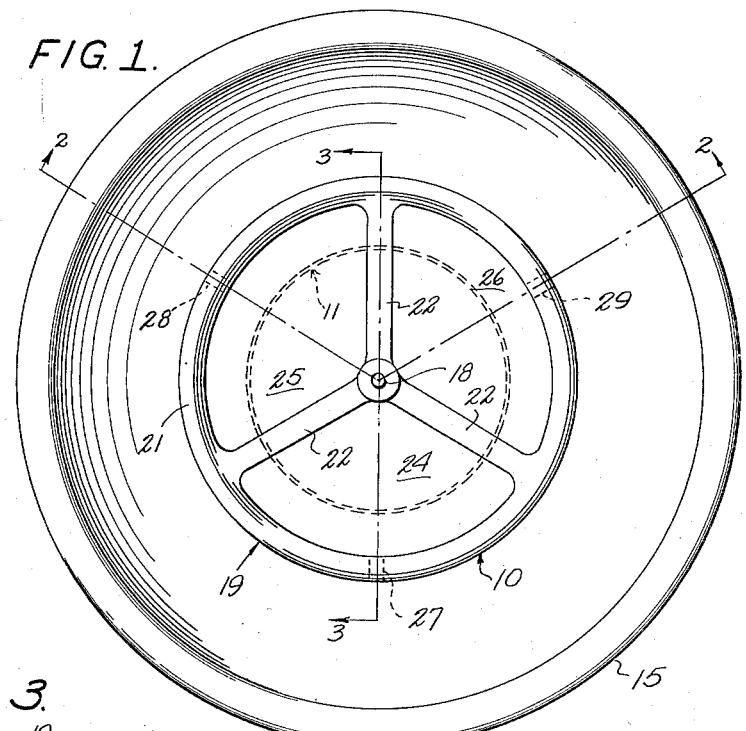
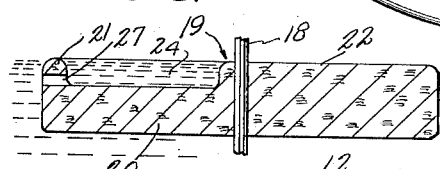
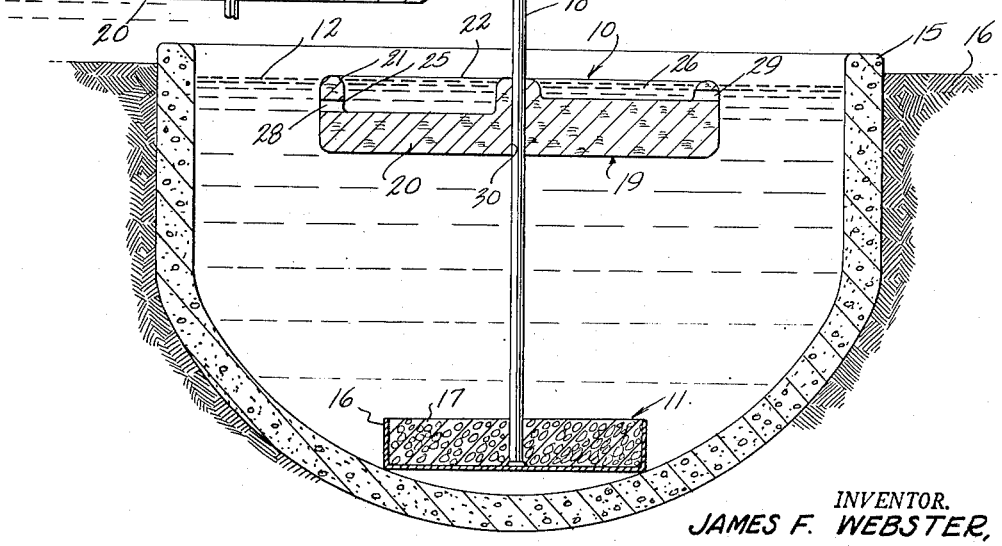
INVENTOR.
JAMES F. WEBSTER,
BY
McMorrow, Berman + Davidson
ATTORNEYS.

Patented Jan. 29, 1952

2,583,911

UNITED STATES PATENT OFFICE 2,583,911

FLOATING BIRDBATH

James F. Webster, Lafayette, Ind.

Application October 20, 1950, Serial No. 191,125

3 Claims. (Cl. 119—1)

This invention relates to floating bird baths, and more particularly to such bird baths which will maintain a constant water level.

It is an object of this invention to provide a floating bird bath which is adapted to be supported in a static body of water, and when so supported will maintain a constant water level.

Another object of this invention is to provide a floating bird bath which may be substantially anchored in a static body of water, and yet be capable of maintaining a constant water level irrespective of the fluctuations in the level of the water body.

A further object of this invention is to provide a floating bird bath which is simple in construction, economical in manufacture, and efficient in operation.

With the above and other objects in view, my invention consists in the arrangement, combination and details of construction disclosed in the drawings and specification, and then more particularly pointed out in the appended claims.

In the drawings:

Figure 1 is a top plan view of a bird bath constructed according to this invention;

Figure 2 is a transverse sectional view taken on the line 2—2 of Figure 1;

Figure 3 is a fragmentary detail sectional view, partly broken away, taken on the line 3—3 of Figure 1.

Referring to the drawings, the numeral 10 designates generally a bird bath constructed according to an embodiment of this invention. The bird bath 10 includes a weighted base 11 and a tray 19 fabricated of a buoyant material and including a bottom 20 and upstanding walls 21 secured to the bottom 20, the tray being arranged in spaced relation with respect to the weighted base 11 and connected to the base for movement toward and away from the latter, there being an opening in the upstanding wall adjacent to and spaced from the upper end for the ingress of the water. The bird bath 10 is adapted to be positioned on the bottom of a body of still water 12. For the purpose of illustration, the body of water 12 is contained in a bowl or tank 15 sunk into the ground 16, the tank 15 being open on the upper end thereof, as clearly shown in Figure 2 of the drawings.

The weight base 11 includes a hollow receptacle 16 filled with gravel or other weighted ballast 17 suitable for anchoring the receptacle in the bottom of the body of water 12, and is provided with an upstanding rod 18 secured at its lower end to the receptacle, the upper end of the rod 18 projecting above the surface of the water body.

The tray 19 is fabricated of a buoyant material, such as wood, cork or the like, and is arranged in spaced relation with respect to the base 11, and is provided with a central bore 30 for slidably receiving the upper end of the rod 18 for movement of the tray 19 toward and away from the base upon the fall and rise of the water level of the body of water 12.

Disposed within the tray 19 are upstanding partition plates 22, which, as shown in Figure 1, comprise three plates arranged in diverging relation and secured to the bottom wall 20 and to the inner surface of the upstanding walls 21, the plates 22 forming with the adjacent portions of the upstanding walls 21 and the bottom wall 20 separated compartments 24, 25 and 26, respectively, as shown in Figure 1. Although three partition plates 22 are shown, it is to be understood that one or more partition plates 22 may be employed, the plate being disposed within the tray, so that the ends are secured to the inner surface of the upstanding walls 21 with the lower ends secured to the inner surface of the bottom 20.

The upstanding walls 21 are provided with a plurality of transverse openings 27, 28 and 29 adjacent to and spaced from the upper ends, opening into the compartments 24, 25 and 26, respectively, for the ingress of the water into the separate compartments from the body of water 12 on which the tray 19 is supported and thereby maintaining a constant level of water in the compartments irrespective of fluctuations in the level of the water body.

By reference to Figures 2 and 3, it will be noted that the portions of the bottom 20 constituting the bottom of compartments 24, 25 and 26 are cut away inwardly to different degrees, the portion constituting the bottom of compartment 25 being cut away to the greatest degree, the portion constituting the bottom of compartment 26 being cut away to the least degree, and the portion constituting the bottom of compartment 24 being cut away to a lesser degree than the bottom of compartment 25 and to a greater degree than the bottom of the compartment 26. Thus, the compartments 26, 24 and 25 are of gradually increasing depths.

I do not mean to confine myself to the exact details of construction herein disclosed, but claim all variations falling within the purview of the appended claims.

I claim:

1. A bird bath comprising a weighted base and a tray including a bottom and upstanding walls secured to said bottom and fabricated of a buoyant material arranged in spaced relation with respect to the base and connected to said base for movement toward and away from the latter, the upstanding wall of said tray being provided with an opening adjacent to and spaced from the upper end for ingress of water therethrough.

2. A bird bath comprising a weighted base, an upstanding rod having its lower end secured to said weighted base, and a tray including a bottom and an upstanding wall secured to said bottom and fabricated of a buoyant material arranged in spaced relation with respect to said base and mounted on said rod for movement toward and away from said base, the upstanding wall of said tray being provided with an opening adjacent to and spaced from the upper end for ingress of water therethrough.

3. A bird bath comprising a weighted base, an upstanding rod having its lower end secured to said weighted base, and a tray including a bottom and an upstanding wall secured to said bottom and fabricated of a buoyant material arranged in spaced relation with respect to said base and mounted on said rod for movement toward and away from said base, and at least one upstanding partition plate positioned upon the bottom of said tray and having its ends connected to the inner face of said upstanding wall and forming with the adjacent portions of said upstanding wall and bottom separated compartments, there being an opening extending through said adjacent portions of the upstanding wall of said tray for the ingress of water therethrough.

JAMES F. WEBSTER.

No references cited.